United States Patent
Hochbrueckner

[11] Patent Number: 6,012,411
[45] Date of Patent: Jan. 11, 2000

[54] PROPANE TANK COVER

[76] Inventor: Kenneth Hochbrueckner, 85-12 115th St., Richmond Hill, N.Y. 11418

[21] Appl. No.: 08/901,035

[22] Filed: Jul. 25, 1997

[51] Int. Cl.⁷ .................................................. B65D 65/02
[52] U.S. Cl. ........................ 116/207; 116/200; 116/227; 116/280; 150/154
[58] Field of Search ................................ 116/207, 206, 116/200, 216, 227, 280, DIG. 1; 150/154; 73/49.2, 49.3; 206/459.1

[56] References Cited

U.S. PATENT DOCUMENTS

| | | | |
|---|---|---|---|
| D. 283,988 | 5/1986 | Kaniwec et al. | D10/101 |
| 1,375,480 | 4/1921 | West | 150/154 |
| 1,460,461 | 7/1923 | West | 150/154 |
| 1,561,101 | 11/1925 | Mott et al. | 220/581 |
| 2,426,475 | 8/1947 | Van Frank | 62/316 |
| 4,039,098 | 8/1977 | Stilts | 220/694.1 |
| 4,177,836 | 12/1979 | Thompson | 138/30 |
| 4,223,692 | 9/1980 | Perry | 137/78.4 |
| 4,301,828 | 11/1981 | Martin | 137/381 |
| 4,507,961 | 4/1985 | Stradella | 73/317 |
| 4,688,028 | 8/1987 | Conn | 340/625 |
| 4,802,344 | 2/1989 | LIvingston et al. | 62/400 |
| 4,841,969 | 6/1989 | Dennerhack et al. | 607/114 |
| 4,844,286 | 7/1989 | Jacobson | 220/581 |
| 4,905,855 | 3/1990 | Troiano et al. | 220/581 |
| 4,964,529 | 10/1990 | Houston | 206/523 |
| 5,251,460 | 10/1993 | DeMarco et al. | 62/371 |
| 5,266,772 | 11/1993 | Reed | 219/137 R |
| 5,429,267 | 7/1995 | San | 220/581 |
| 5,555,764 | 9/1996 | Dybas | 73/296 |
| 5,563,578 | 10/1996 | Isenstein | 340/521 |
| 5,624,048 | 4/1997 | Sander et al. | 215/395 |
| 5,638,858 | 6/1997 | Gettinger et al. | 137/382 |
| 5,685,977 | 11/1997 | Golston et al. | 210/169 |

OTHER PUBLICATIONS

Preliminary Production Brief MGS 1000 Series Chemical Gas Sensors, Motorola (1996).

MGS 1100 Carbon Monoxide Gas Sensor, Motorola Semiconductor Technical Data, Motorola, Inc. 1997.

*Primary Examiner*—Andrew Hirshfeld
*Assistant Examiner*—R A Smith
*Attorney, Agent, or Firm*—Milde, Hoffberg & Macklin, LLP

[57] ABSTRACT

A flexible environmental protective cover for a compressed gas transport tank, having a cylindrical body, an upwardly extending valve, and a valve protection structure having a handle opening, the cover comprising a generally cylindrical drape portion; an upwardly extending enveloping portion, adapted to surround the upper valve protection structure of the tank and having an opening corresponding the handle opening, contiguous with the cylindrical drape portion; and an upper portion, inside the upwardly extending enveloping portion, having an aperture corresponding to a location of the upwardly extending valve, and allowing the valve to extend therethrough. The cover may include a business card holder flap, as well as an optional sensor system for determining liquid level in the tank and hazardous environmental gas levels.

20 Claims, 3 Drawing Sheets

PROPANE TANK COVER

FIELD OF THE INVENTION

The present invention relates to the field of flexible covers, and more particularly to the field of flexible covers for liquid transport tanks.

BACKGROUND OF THE INVENTION

Many different types of cover devices are known. Typically, these may be formed of plastic film or paper, and conform, to different extents, to the outer profile of the object to be covered. In some instances, the object is heavy and includes its own handles for carrying. In these instances, the cover typically is not strong enough to support the object, and the handles must thus be accessible for carrying with the cover in place.

A number of known covers are provided for thermal insulation, for example to insulate milk containers. See, for example, U.S. Pat. Nos. 4,301,828, 2,426,476 and 1,460,461. In these cases, the cover may encompass the bottom of the container, to provide insulation at this portion, which may otherwise be a significant source of heat. See also, U.S. Pat. No. 4,964,529.

In the field of propane tanks, a system is known for estimating a remaining propane contents of the tank. See, U.S. Pat. Nos. 5,555,764; 4,688,028; 4,507,961; D283,988. Another known system provides a visible temperature indicator, such as a liquid crystal strip, having a visible transition temperature of about 40–60° F. When in use, the propane in the tank volatilizes to supply the external device, which is typically a burner. While volatilizing, the propane self-cools by the heat of vaporization. Thus, the temperature of the liquid portion drops. While the gaseous portion, undisturbed, would also attain the same temperature, the external environment supplies heat, which is transmitted through the tank wall. Thus, the lower heat capacity of the gaseous propane causes it to heat more than the liquid propane. On the other hand, the higher heat capacity of the liquid will draw more heat through the tank wall. Since the tank wall has a finite heat capacity and thermal conductance, there will be a temperature transition demarcation on the wall of the tank at the liquid-gas junction. A liquid crystal sensing strip will have a color change at this level, allowing visible indication of the liquid level within the tank.

These systems, however, require good thermal contact between the liquid crystal strip and the tank, and only show a demarcation after the tank has been operative for a while. Further, these strips have a limited range operating so too hot or cold an environment, external moisture, or radiant heat may reduce their effectiveness. In addition, the strip does not indicate a level if the tank is empty. Despite these shortcomings, liquid crystal level gages are in use.

Other types of level gages include weight or mass sensors, and floats. These other types of level gages may require significant apparatus and/or modifications internal to the tank.

Combustible gas and carbon monoxide meters are well known, and recent developments in semiconductive sensors and micromachined devices make deployment practical.

SUMMARY OF THE INVENTION

The present invention provides a cover for a typical 30 pound propane tank, used for example for barbecues. This cover has a number of novel aspects. First, the cover has an open bottom, allowing it to be laced over the top of the tank. The upper portion of the cover has a central aperture, suitable for allowing the valve to extend therethrough. Surrounding the central aperture is a circumferential ridge corresponding to the handle/protective rim of the propane tank surrounding the valve. The circumferential ridge is folded on itself, leaving a potential space within which the upper rim of the tank is protected. The upper rim has a set of openings, which are designed as handles. The circumferential ridge has pairs of openings which correspond to the handle openings. Thus, when the cover is placed on the tank, upwardly exposed portions of the tank are covered except for the valve.

The cover is preferably made of a plastic film, such as polyvinyl chloride film, which may be, for example, anti-static coated. The cover may also be formed of paper, e.g., Kraft paper, or a high tensile strength plastic film, such as a polyester. The cover preferably is flexible, allowing it to be neatly folded when not in use. Preferably, a side panel of the cover may be laid flat over a substantial portion, facilitating imprinting of a graphic on the panel.

In one embodiment, the cover is formed of a clear plastic, with a liquid crystal propane level gage strip provided on a vertical axis. The liquid crystal indicator strip is visible through the cover. The inner side of the indicator strip has a thermally conductive composition, which temporarily adheres to the tank, but can be removed and reused, possibly with some minor reconditioning, such as reapplying the thermally conductive composition. The cover protects the strip from the environment.

In another embodiment, the cover is provided with a gas detector to detect combustible gasses and produce an alert if above a threshold level. This serves two purposes. If, when not in use, the valve leaks, the detector may alert nearby persons of a potential hazard. In addition, around a period of use, the alarm will alert the user of a flame out or non-start condition. In the later case, it might be hazardous to ignite the propane if the environment is flooded. This sensor may be, for example, an "intrinsically safe" (i.e., low probability that the detector may itself ignite the propane) electronic sensor detecting the presence of combustible gas, such as a heated thin film sensor. For example, Motorola Senseon MGS-1200 sensor, English Electric Valve (EEV) combustible gas sensor, or similar type may be used.

While carbon monoxide is a normal product of propane combustion, in closed environments, this may become a problem. Therefore, the optional sensor system may also include a carbon monoxide sensor, such as a Motorola Senseon MGS-1100. Alternately, a semiconductor adsorption sensor or electrochemical sensor may be provided.

The sensor system, if provided, preferably has audible and visible alarms. For example, the audible alarm is a piezoelectric transducer, driven near a resonant frequency with a modulated waveform. The visible alarm is, for example, a high brightness LED.

Where an electronic system sensor is provided, it may also encompass a tank level gage as well. In this case, a set of temperature sensors, for example integrated circuits, bipolar devices (e.g., diodes or transistors), thermistors, thermocouples, or the like, are provided in a vertical arrangement along an inner side of the cover. In this case, the electronic system may process the sensor inputs, for example 5–16 sensing elements, to determine a liquid level, thus providing a relative temperature measurement rather than an absolute temperature measurement as would be obtained with a liquid crystal strip gage. Instead of a series of discrete sensors, a single sensor strip may also be provided which changes in characteristics at the temperature change point.

In order to indicate the level, a visible indicator, for example an LCD (liquid crystal display) bar graph display, may be provided in the electronic system, which typically is nested next to the valve and protected by the protective rim of the tank. Thus, the indicator would be at the top of the tank. Alternately, a set of LED's (light emitting diodes) may be provided on a vertical strip, for example adjacent to the sensors, which are illuminated to indicate the liquid level in the tank. Since the LED's are power consuming, it is preferred that LED's be modulated, or the display manually activated. For example, a piezo electric transducer, possible the same element as an audio alarm, is employed as a microphone. When a sound having particular characteristics is sensed, for example a clap, whistle, voice, or the like, the LED's may be illuminated for a period, for example with a 10% duty cycle, 30 Hz repetition for about one half a second. The pulsing of the LEDs is advantageous in that it improved the efficiency of LED driving and provides improved perception, while limiting power draw. The LED's may be bicolor LED's, e.g., red and green, with those above the level red, those below the level red, and that at the level yellow (bipolar excitation). Alternately, the one LED at the level may be illuminated or those below the level illuminated. These functions are typically defined in the software of a microcontroller which controls the electronic system.

According to a different embodiment, the level gage operates by other than temperature change height. For example, the an active transducer may be used to measure the thermal capacitance of the tank wall, which changes at the liquid height. Thus, a set of small heaters are provided which heat the wall by 2° C. The relaxation time to the ambient temperature is measured. The liquid will cool the wall faster than the gas.

An acoustic sensor or acoustic sensor array may be used to produce acoustic waves, which characteristically differ based on the liquid level. In this case, the acoustic damping of the cover is compensated for. For example, a linear array of piezoelectric elements rest against the tank wall. One or more elements of the array are excited, for example in a pulse or chirp waveform, and each of the sensors "listens". Due to the differences in the acoustic properties of the liquid with respect to the gas, the sensors will have outputs which distinguish a liquid level. Alternately, an acoustic transducer excites wave in the wall of the tank, which travels down the side the tank. At the liquid level, an impedance mismatch occurs and a portion of the wave is reflected. The characteristic timing of the reflection is determined, as is well known in the field of time domain reflectometry. The sensor control may be, for example, an adaptive control, and thus need not be separately calibrated for every tank.

Another optional feature of the cover is a holder for a document, for example a receipt, business card, or identification. This holder preferably protects the document from the environment, and this, for example, has a fold-over top flap, or other type of seal, e.g., a zipper, "zip lock®" seal, of other type of environmentally secure closure. Thus holder is preferably formed at a junction of a sidewall and upper portion of the cover, as a flap, but may also be formed affixed to the upper portion of the cover, such as to a portion of the circumferential ridge. The holder compartment is preferably suitable for holding a business card, for example identifying the filler or distributor.

The invention thus consists of a flexible cover which conforms to the outer profile of a standard propane tank for, e.g., used in propane grills. The cover provides protection from dripping grease, as well as other environmental effects. These tanks are approximately 18" high and 12" diameter, with a valve system centered on the top surrounded by a handle/protective cage about 270°. The valve handle extends upward, below the upper extent of the handle/protective cage, and has a nozzle which projects at right angles toward the open portion of the handle/protective cage. The handle/protective cage has three openings, a larger of which serves as a handle. The base of the tank includes a conic section between a spherical lower portion of the tank and the ground. The upper portion of the cover has an aperture through which the valve structure protrudes. Surrounding the valve aperture, the cover extends upward to conform to the handle/protective cage and having corresponding apertures. The cover is placed over the tank. The cover preferably extends nearly to the ground, and preferably is not inwardly tapered or gathered, so that a silk-screen or stamped impression may be imposed on a flat surface of the cover, for decoration and identification. The cover may be sewn from three sections, a cylindrical lower portion, a conical bridging upper portion, and a three dimensionally configured top portion which conforms to the handle/protective cage and having the valve structure aperture. The cover may also be formed as a single molded piece. The cover is preferably formed of an antistatic plastic film, such as a treated 6 mil transparent polyvinyl chloride textured film.

It is therefore an object of the present invention to provide a flexible cover for a compressed gas transport container having, situated on an upper portion, at least one transport handle, forming a passage surrounded by the handle and the container, and a valve structure, the cover protecting the tank and transport handles and having an open bottom, a pair of apertures corresponding to each transport handle passage and an aperture corresponding to the valve structure.

It is another object of the invention to provide an environmental protective cover for a compressed gas transport tank, having a generally cylindrical drape portion, an inwardly tapering portion adjacent an upper edge of the cylindrical portion, an upwardly extending dual wall ring, adapted to surround an upper valve protection structure of the tank and having an opening corresponding a handle structure in the upper valve protection structure, and an upper aperture, corresponding to a location of the tank valve, and allowing the valve to extend therethrough.

It is still another object of the invention to provide a cover for a compressed gas transport cylinder having a cylindrical body, a spherical upper portion, a valve extending upward from the spherical upper portion, and a protective cage surrounding the valve, having a handle structure formed therein, the cover comprising a plastic film formed having cylindrical lower portion, a tapered neck above the cylindrical lower portion, an upwardly extending rim, conforming to a profile of the protective cage, and providing external access to the handle structure, and a central aperture aligned with a valve position.

It is also an object of the invention to provide a cover for a propane tank with is formed of an antistatic coated plastic film, which is flame retardant.

It is an additional object of the invention to provide a liquid level sensor for a propane tank having an active transducer, for example producing heat or acoustic waves.

It is a further object of the invention to provide a propane tank cover associated with a selective gas sensor, for example propane, other combustible gasses or carbon monoxide.

It is still another object of the invention to provide a thermal responsive liquid level gage visible through a sidewall of a cover for a propane tank, held in thermal communication against a wall of the tank.

These and other objects will become clear through a review of the drawings and detailed description of the preferred embodiments.

BRIEF DESCRIPTION OF THE DRAWINGS

The invention will now be described with respect to the drawings, in which.

DETAILED DESCRIPTION OF THE PREFERRED EMBODIMENTS

As shown in FIGS. 1–4, a cover is provided conforming to the upper portion of a propane tank. The cover is preferably formed of a flame retardant, antistatic agent coated, plastic film, such as polyvinyl chloride. The film may be sewn, heat sealed, RF-sealed, glued, molded or plastically deformed at elevated temperatures into the desired configuration. The free edges of the cover may be rolled or seamed, in known manner.

Figure 1:
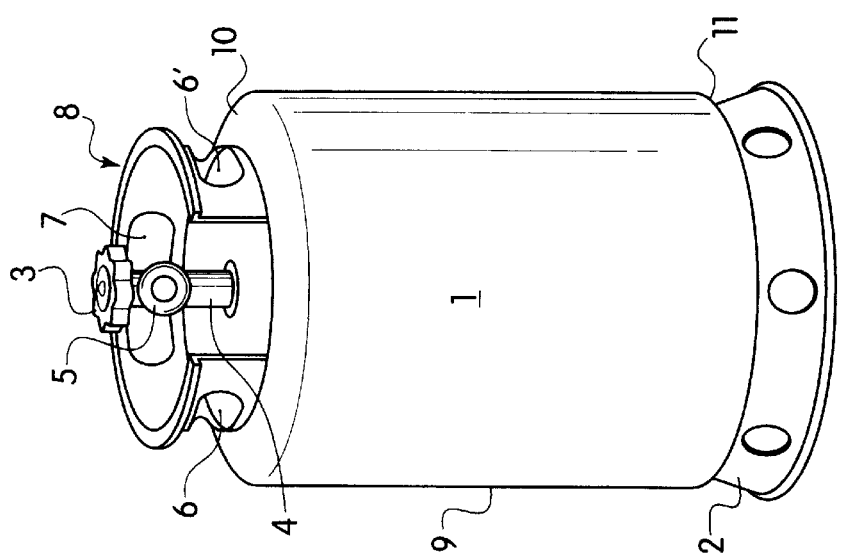
FIG. 1 is a perspective view of a prior art propane tank.

As seen in FIG. 1, a standard 30 pound propane tank 1 has a cylindrical body 9 with upper 10 and lower 11 spherical caps. The lower cap 11 is surrounded by an inwardly tapering conical base 2, which has an maximum outer diameter approximately equal to the cylindrical body 9 diameter, providing a stable base. The diameter of the tank 1 is approximately 12 inches and the height 18 inches. Extending upward from the center of the top spherical cap 10 is a valve structure 4, which has a side port 5. Surrounding the valve structure 4, leaving access to the side port 5, is a protective cage 8. This protective cage 8 thus surrounds about three quarters of the valve structure 4. The protective cage 8 has a three openings 6, 6", 7, which serve as handles for manual carrying. A middle opening 7, opposite the valve side access port 5, is larger than the adjacent openings 6, 6".

Figure 3:
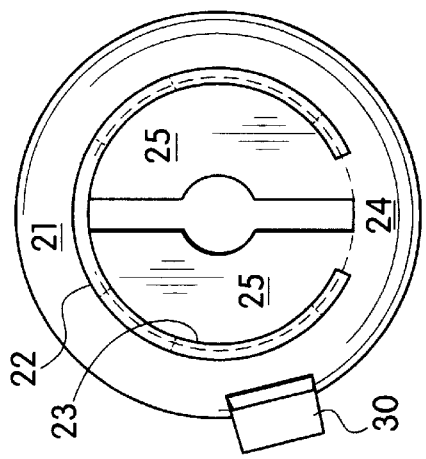
FIG. 3 is a top view of the cover according to the present invention.
Figure 2:
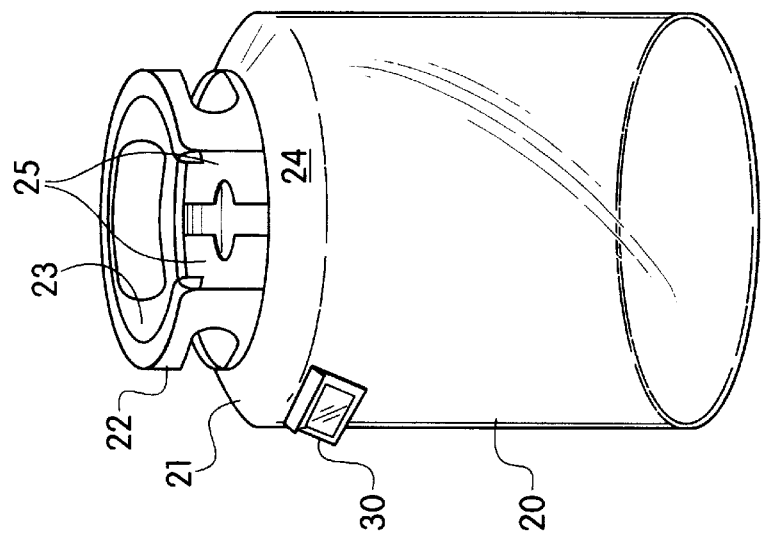
FIG. 2 is a side view of the cover according to the present invention.

As seen in FIGS. 2–3, a cover is provided which conforms to the upper portion of the propane tank 1. A cylindrical dependent portion 20 covers the cylindrical body 9 of the tank 1, and may be laid relatively flat for printing in a press, for example with a graphic or lettering. Above the cylindrical dependent portion 20 is a conical tapered portion 21. An upwardly extending cage portion 22 extends above the conical tapered portion 21, conforming to the shape of the protective cage 8 of the propane tank 1. The inner side 23 of the upwardly extending cage portion 22 and the edge of the conical tapered portion 21 corresponding to the side port 5 access portion 24, are connected to a relatively flat upper portion 25, which is split, allowing the valve structure 4, valve handle 3, and side port 5 to pass therethrough.

Figure 4:
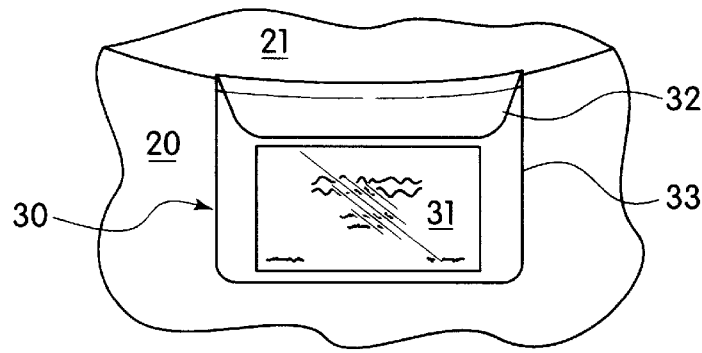
FIG. 4 is a detail view of a document holder pouch.

As shown in FIG. 4, a document holder 30 is provided at the junction of the cylindrical dependent portion 20 and the conical tapered portion 21. This holder 30 is adapted to hold standard business cards 31, and has a flap 32 which protects the card 31 from the environment, for example precipitation.

The document holder 30 is thus formed of front 33 and rear panels, with a portion of the rear panel covering the front panel 33 as the flap 32 with a space formed therebetween.

Figure 5A:
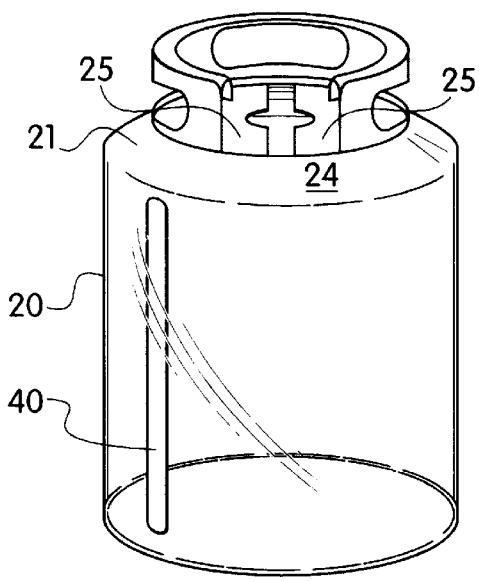
FIGS. 5A and 5B are detail view and cross section of a liquid level gage strip.
Figure 5B:
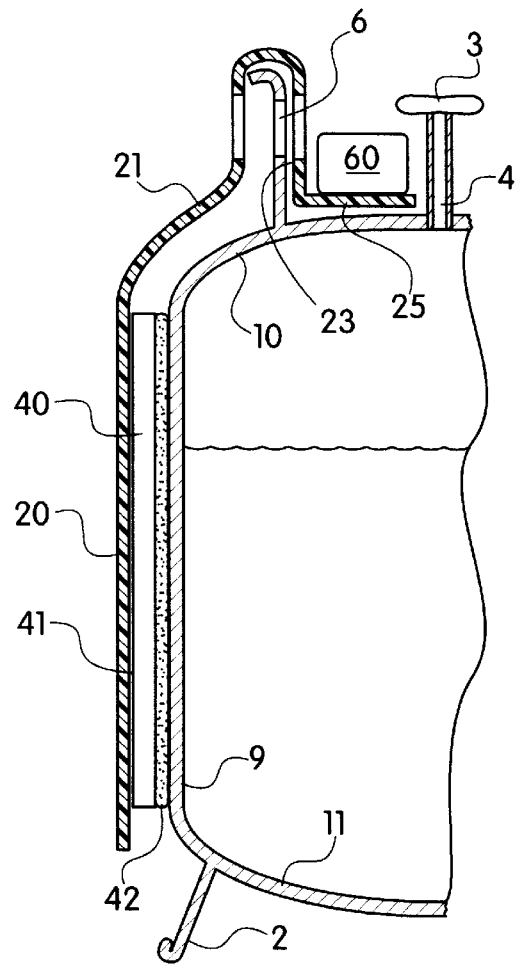

As shown in FIGS. 5A and 5B, a sensor strip 40 may be provided inside the cylindrical dependent portion 20 of the cover, in contact with the wall of the cylindrical portion 9 of the tank 1, with an outer portion 41 visible through the cover, Thus, the sensor strip 40 is protected, but remains functional. This sensor strip 40 contains one or more sensing elements, which may be active or passive, and operate by determining thermal or acoustic characteristics of the tank wall. This sensor strip is, for example, a liquid crystal thermally responsive strip, having a color transition, for example, over a range of temperatures from 35–85° F. The sensor strip 40 is held in contact with the wall of the tank by a viscous or tacky film 42, which ensures thermal and/or acoustic conduction.

Figure 6:
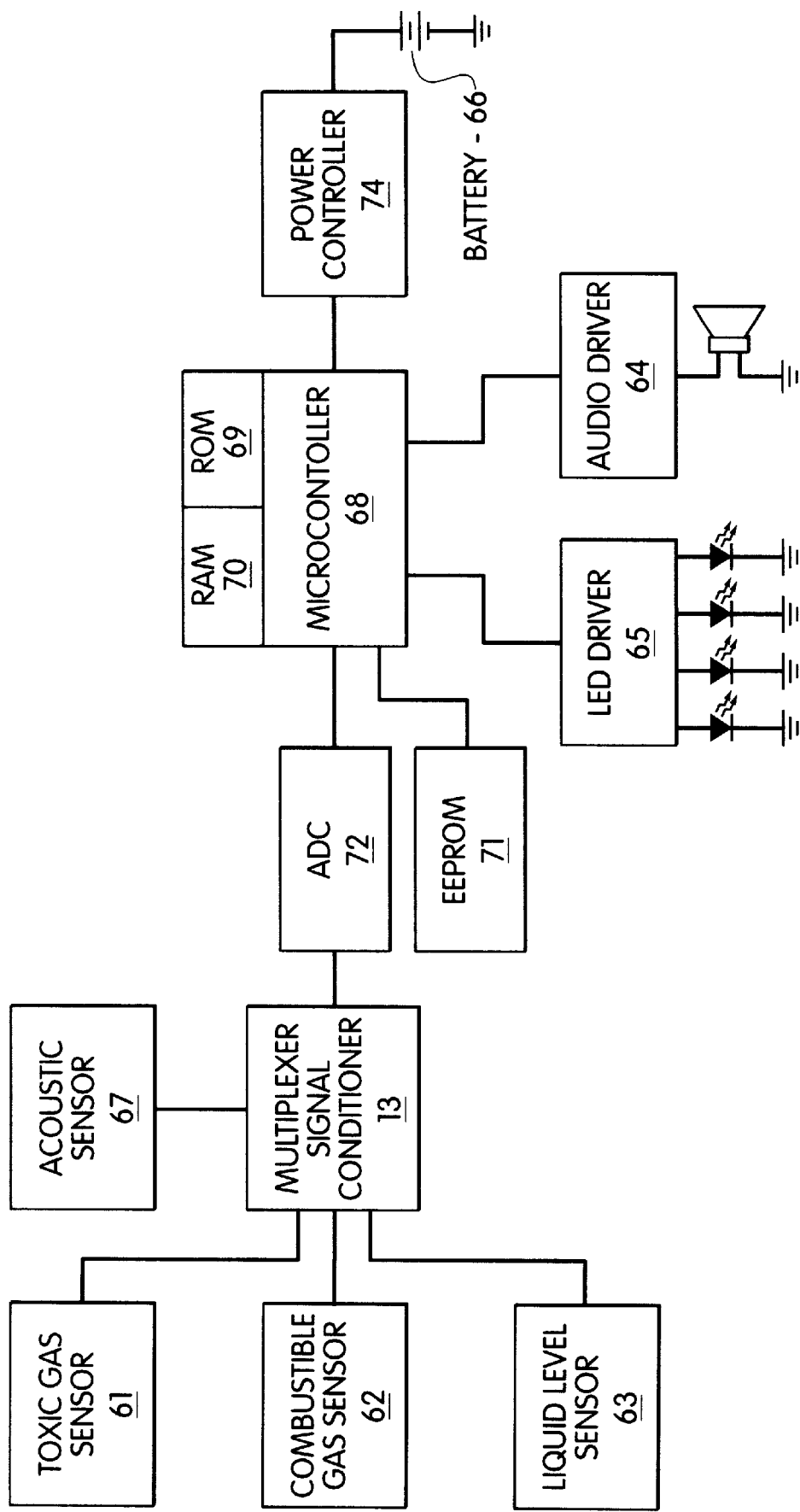
FIG. 6 is a schematic drawing of an electronic device for operating gas and liquid level sensor systems.

FIG. 6 shows a schematic drawing of an electronic device 60 which optionally sits on under the top of the cover, for example inside the protective cage and adjacent to the valve. The electronic device has a number of optional sensor systems, including carbon monoxide, combustible gas, and tank propane level. The electronic device provides sensor excitation and signal conditioning circuits for each sensor system, a digitizer, for converting analog sensor signals to digital values, a microcontroller, having non-volatile program memory, volatile working memory, and persistent memory for adaptive parameters. The microcontroller also receives user input to control the operation and produces outputs including audible and visible alarms, as well as tank propane level indication. The electronic device is battery powered, and is preferably intrinsically safe, meaning that, even with a fault condition, it will not be capable of igniting a combustible gas in the environment. This intrinsic safety is achieved by the avoidance of energy storage elements configured to provide spark energy to ignite a flame, and through the use of flame arresters. A power controller 74 controls the power supply of the system.

The carbon monoxide sensor 61 is a semiconductive sensor which selectively changes impedance with carbon monoxide concentration. For example a Senseon MGS 1100 type device. The electronic device drives the sensor to determine its impedance, digitizes a voltage related to the impedance, and processes the digitized values to determine whether a carbon monoxide hazard exists.

The combustible gas sensor 62 is a micromachined sensor element covered with a catalytic material, which is electrically heated. For example, a Senseon MGS 1200 type device employs a tin oxide film. The temperature of the sensor is measured, for example as compared to a like sensor element absent the catalyst. In some sensors, such as the MGS 1200, the propane interacts with the heated catalyst to alter its conductivity. In other systems, the degree of temperature rise of the catalytic element is related to the amount (caloric content) of combustible gas present. A sensor may also be selected which is capable of being intermittently powered, for example 2 seconds (or until sensor stability is reached) per minute, to reduce power drain. A voltage relating to the temperature of the elements is input into the microcontroller, which processes the data to determine whether an explosion hazard or propane leakage is present. An acoustic sensor, such as a microphone or piezoelectric element may be provided to determine whether the propane tank is in use or not, a use condition causing some turbulence induced noise in the valve.

The tank level indicator 63 is formed as a linearly disposed array of silicon diodes, for example 1N914 type.

These diodes are held in thermal communication with the tank, for example by a viscous grease or temporary adhesive. Over the diodes is placed a uniform heating strip. The diodes have a known temperature response characteristic, and thus the temperature at each diode may be measured. The level is determined by the point in the array at which a significant temperature change occurs. When there is no temperature change, such as with an empty or inoperative tank, the heating strip heats the wall of the tank by a small amount, controlled by the microcontroller. This temperature change is sufficient to produce a significant response in the temperature sensing elements. The heater excitation is then stopped, and the temperature sensors monitored. Liquid propane through the wall will cool the wall faster than gas, so the liquid level may be determined.

In the event of hazardous carbon monoxide or combustible gas levels, an audio 64 and visual 65 alarm may be created. If not corrected within a reasonable period, the visual alert is ceased and the audio alert operated in a pulsatile manner, in order to conserve the battery 66. In the event of a low propane tank level, a differentiated audio alert, such as a mild chirp, may be sounded. An array of LED's 65 are provided corresponding to the temperature sensor diodes on the tank wall. The audio transducer 67 is monitored for turbulent noise in the valve 4. During the period of this noise, the LED's are lit, up to the level of propane, with a 10% duty cycle, 3 mS on, 27 mS off, for 600 mS, repeated either on demand or intermittently, for example every minute. These same LED's may be used for the visual alert, for example in a brighter mode, 20% duty cycle, 6 mS on, 24 mS off, alternating 300 mS on, 300 mS off.

The microcontroller 68 program is stored in read only memory (ROM) 69. The microcontroller operates using temporary storage in registers and random access memory (RAM) 70. Sensor calibration data, as well as environmental factors and data about the propane tank may be persistently stored and updated in electrically erasable programmable read only memory (EEPROM) 71. The microcontroller 68 preferably has a 10 bit analog to digital converter (ADC) 72 for reading sensor signals. Sensor signals are conditioned and multiplexed by a multiplexer/signal conditioner 73 prior to digitization in the ADC 72.

There has thus been shown and described novel propane tank covers and systems and methods which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A flexible environmental protective cover in combination with a compressed gas transport tank, having a cylindrical body, an upwardly extending valve, and a valve protection structure having a handle opening, said cover comprising:

a generally cylindrical drape portion;

an upwardly extending enveloping portion, adapted to surround the upper valve protection structure of the tank and having an opening adapted to correspond to the handle opening, contiguous with said cylindrical drape portion;

and an upper portion, radially medial said to upwardly extending enveloping portion, having an aperture adapted to correspond a location of the upwardly extending valve, so as to allow the valve to extend therethrough.

2. The cover according to claim 1, wherein the compressed gas transport tank comprises a cylindrical body, an upwardly extending valve, a valve protection structure having a handle opening, and a spherical upper portion, said cover further comprising an inwardly tapering portion between said cylindrical portion and said upwardly extending enveloping portion.

3. The cover according to claim 1, wherein the compressed gas transport tank comprises a cylindrical body, an upwardly extending valve, a valve protection structure having a handle opening, wherein said valve has a side port and is partially surrounded by said valve protection structure, said upwardly extending enveloping portion of said cover conforming to a profile of said valve protection structure.

4. The cover according to claim 1, formed of a flexible plastic film.

5. The cover according to claim 1, further comprising an externally accessible document compartment having a transparent wall, affixed to said cover.

6. The cover according to claim 1, wherein the compressed gas transport tank is a propane tank, further comprising a non-contact propane level indicator, adapted to contact a wall of the propane tank, provided inside said cylindrical portion.

7. The cover according to claim 6, wherein said non-contact level indicator comprises a passive temperature indicator strip.

8. The cover according to claim 6, wherein said non-contact level indicator comprises an active thermal capacity determining system.

9. The cover according to claim 6, wherein said non-contact level indicator comprises an acoustic sensor.

10. The cover according to claim 1, further comprising a selectively operable condition indicator.

11. The cover according to claim 10, wherein said condition indicator is an acoustic device.

12. The cover according to claim 10, wherein said condition indicator is an optical device.

13. The cover according to claim 10, wherein said condition indicator indicates a low tank propane level.

14. The cover according to claim 10, wherein said condition indicator indicates an environmental presence of combustible gas.

15. The cover according to claim 10, wherein said condition indicator indicates an environmental presence of a toxic gas.

16. The cover according to claim 1, further comprising a selective environmental condition sensor.

17. The cover according to claim 1, further comprising a selective environmental gas sensor.

18. The cover according to claim 1, further comprising a liquid crystal thermal liquid level indicator, adapted to contact a sidewall of the compressed gas transport tank, said liquid crystal thermal level indicator being visible external to said cover.

19. The cover according to claim 1, formed of an antistatic coated plastic film.

20. The cover according to claim 1, formed of a flame retardant plastic film.

* * * * *